July 9, 1946.  G. MEYER ET AL  2,403,449

HOSE CLAMP

Filed March 8, 1943

INVENTORS
GERHARD MEYER
CLAY G. WOODMANSEE
BY Lloyd Spencer
ATTORNEY

Patented July 9, 1946

2,403,449

UNITED STATES PATENT OFFICE 2,403,449

HOSE CLAMP

Gerhard Meyer and Clay G. Woodmansee, Los Angeles, Calif., assignors to Lane-Wells Company, Los Angeles, Calif., a corporation of Delaware Application March 8, 1943, Serial No. 478,450

12 Claims. (Cl. 24—19)

1

Our invention relates to hose clamps, and among the objects of our invention are:

First, to provide a hose clamp which insures uniform radial compression of the hose, thus avoiding appreciable circumferential movement of the walls of the hose as the clamp is tightened, so that no part of the circumference of the hose is under tension;

Second, to provide a hose clamp which, by reason of its uniform constrictional pressure, is inherently satisfactory under extreme conditions of temperature and humidity, and continues to hold the hose satisfactorily even though the hose has deteriorated in service, and does not in any manner accelerate deterioration of the hose so that failure of the hose occurs, if at all, elsewhere than in the region held by the clamp;

Third, to provide a hose clamp which requires a minimum amount of force in order to properly clamp the hose, permitting use of thumb screws or similar hand operated tightening means, thereby facilitating installation and adjustment without tools;

Fourth, to provide a hose clamp which utilizes radially movable compressor shoes acting individually, but indirectly on the hose through a resilient compressor band, the band being adapted to maintain pressure on the hose even though the material comprising the hose should "creep" or partially displace from under the clamp; and Fifth, to provide a hose clamp which is an improvement of a copending application of one of the inventors herein, Serial No. 478,449, filed March 8, 1943.

With the above and other objects in view, as may appear hereinafter, reference is directed to the accompanying drawing, in which.

Figure 1:
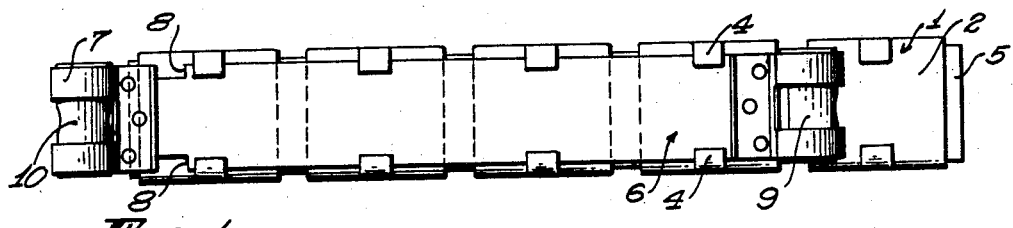
Figure 1 is a developed view of our hose clamp.
Figure 2:
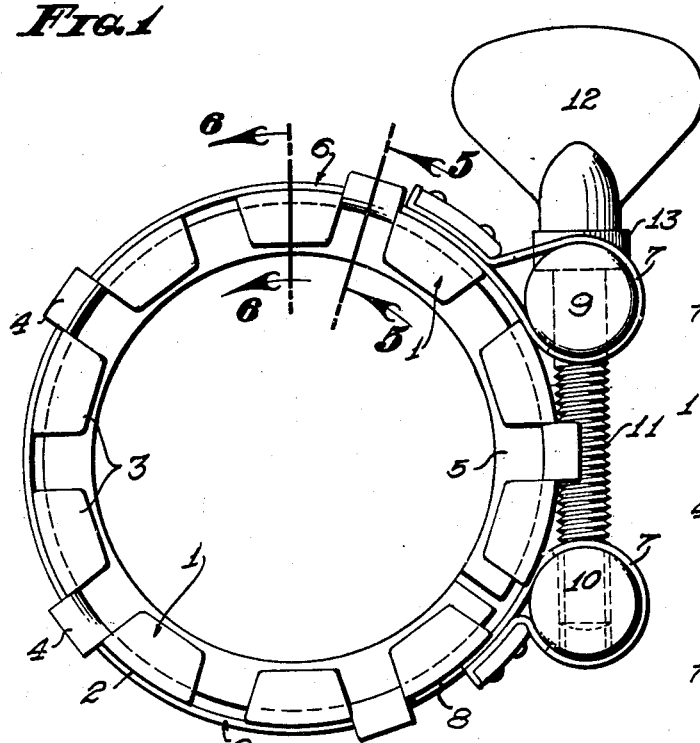
Figure 2 is an end elevational view thereof showing the hose clamp in its expanded position.
Figure 3:
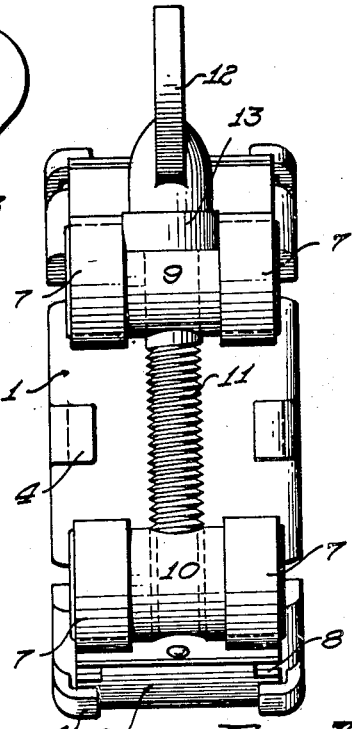
Figure 3 is a side elevational view thereof.
Figure 4:
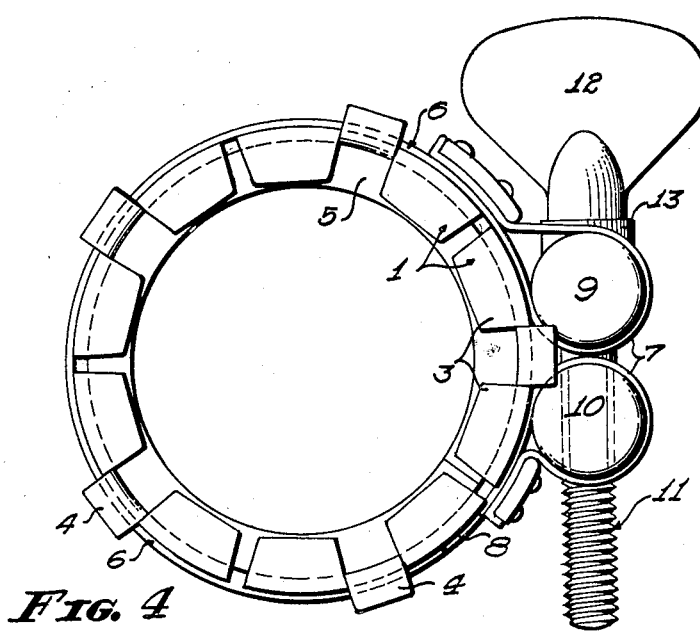
Figure 5:
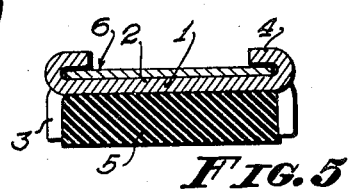
Figure 6:
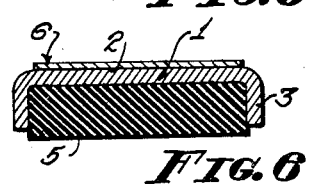

Figure 4 is an end elevational view similar to Figure 2, but showing the hose clamp in its contracted position; and Figures 5 and 6 are transverse sectional views taken through 5—5 and 6—6, respectively, of Figure 2.

The hose clamp employs a plurality of compressor shoes 1 which may be identical to each other in construction. Each compressor shoe comprises an arcuate portion 2, from each of the two sides of which extends a pair of radially directed side portions 3. Each pair of side portions is separated by a strap retainer lug 4, which is

2 bent radially outwardly and over the outer side of the arcuate portion 2.

The radially inwardly extending side portions 3 are adapted to grip the sides of a compressor band 5. The compressor shoes are spaced an equal distance around the periphery of the compressor band. The compressor band 5 is formed of rubber or analogous material with or without reinforcing, depending upon the conditions under which the hose clamp is to be used, or may be formed principally of fabric.

Around the outer side of the compressor shoes extends a strap 6. The strap is metallic, relatively thin and flexible. It is retained in position on the shoes by the lugs 4. The extremities of the strap 6 are formed into loops 7. In order to thread the strap onto the compressor shoes, near one end the strap is provided with side notches 8 so that this portion of the strap may be slipped over the pairs of lugs in succession as the strap is threaded around the compressor shoes.

The end loops 7 are bifurcated and receive journal bars 9 and 10. The journal bars are cylindrical and adapted to rotate a limited amount within the loops about axes parallel to the axis defined by the hose clamp. The journal bar 9 has a clearance hole extending transversely therethrough between the two parts of the corresponding end loop, while the journal bar 10 is provided with a threaded transverse bore. A screw 11 connects the two journal bars. One end of the screw may have means for receiving a tool such as a screw driver or wrench, or may be provided with a handle 12 similar to a thumb screw so that it may be tightened or loosened by hand. Between the handle and the journal bar 9 the screw 11 is provided with a thrust bearing 13.

Operation of our hose clamp is as follows: The ends of the hose clamp are separated by removing the screw 11. The hose clamp is quite flexible and may be readily spread to be slipped around the hose. The screw is inserted and tightened. It will be noticed from a comparison of Figures 2 and 4 that each of the compressor shoes 1 move radially inward with no appreciable circumferential movement. The inner band 5 is compressed radially and at the same time restrained against axial distortion so that it is forced tightly against the hose. While the compressor shoes themselves distribute the compression pressure substantially uniformly about the periphery of the hose, any slight variation in the pressure is fully compensated for by the yieldable or resilient compressor band. Furthermore, the compressor band tends to compensate for changes in the diameter of the hose due to swelling or axial creeping or flowing of the hose material from under the clamp.

In some instances it is desirable to cement the compression ring 5 to the hose and permit the heat that might exist by reason of the conditions of use of the clamp to, in effect, vulcanize the band to the hose. If this is done, flowing or creeping of the hose is reduced and this is due to the fact that the compression band 5 is restrained against axial flowing by the side portions 3 of the compressor shoes.

It will be noted that the shoes and the strap are both metal; as a consequence, the friction between the shoes and strap may be reduced to a minimum and thereby permit the use of a thumb screw type handle for the purpose of tightening the clamp. In addition, graphite or other lubricants may be placed between the strap and the shoes, or the choice of metal comprising the strap and shoes may be such as to exhibit inherently low coefficient of friction.

Various changes and alternate arrangements may be made within the scope of the appended claims, in which it is our intention to claim all novelty inherent in the invention.

We claim:

1. A hose clamp comprising: a flexible band adapted to be looped about a hose; a plurality of segmental shoe elements mounted on said band; a tension strap around said shoe elements and slidable thereon; and means for drawing the ends of said strap together to move said shoe elements radially inwardly and constrict said band.

2. A hose clamp comprising: a resilient band adapted to be wrapped about a hose; a plurality of segmental shoe elements attached to said band and yieldably spaced arcuately from each other by said band; a tension strap encircling said shoe elements and slidable circumferentially thereon; and means for drawing the ends of said strap together to move said shoe elements radially inwardly and constrict said resilient band.

3. A hose clamp comprising: a flexible band adapted to be wrapped about a hose; a plurality of segmental shoe elements fitting over the outer surface of said band and including radially extending portions gripping the axial edges of said band; a tension strap encircling said shoe elements and slidable circumferentially thereon; and means for drawing the ends of said strap together to move said shoe elements radially inwardly and constrict said band.

4. A hose clamp comprising: a resilient band adapted to be looped about a hose; a plurality of segmental shoe elements mounted on said band; a tension strap around said shoes and slidable thereon; retainer lugs extending from the shoe elements and overlying the margins of said strap to retain said strap about said shoe elements; and means for drawing the ends of said strap together to move said shoe elements radially inwardly and constrict said resilient band.

5. A hose clamp comprising: a flexible band adapted to be wrapped about a hose; a plurality of segmental shoe elements attached to said band and yieldably spaced thereby arcuately from each other; a tension strap encircling said shoe elements and slidable circumferentially thereon; retainer lugs extending from the shoe elements and overlying the margins of said strap to retain said strap about said shoe elements; and means for drawing the ends of said strap together to move said shoe elements radially inwardly and constrict said band.

6. A hose clamp comprising: a resilient band adapted to be wrapped about a hose; a plurality of segmental shoe elements fitting over the outer surface of said band and including radially extending portions gripping the axial edges of said band; a tension strap encircling said shoe elements and slidable circumferentially thereon; retainer lugs extending from the shoe elements and overlying the margins of said strap to retain said strap about said shoe elements; and means for drawing the ends of said strap together to move said shoe elements radially inwardly and constrict said resilient band.

7. A hose clamp comprising: a flexible band adapted to be wrapped about a hose; a plurality of segmental shoe elements attached to said band and yieldably spaced thereby arcuately from each other; and means for moving said segmental shoe elements radially to constrict said band.

8. A hose clamp comprising: a resilient band adapted to be wrapped about a hose; a plurality of segmental shoe elements fitting over the outer surface of said band and including radially extending portions gripping the axial edges of said band; and means for moving said segmental shoe elements radially to constrict said band.

9. A conduit clamp comprising: a plurality of shoe elements, each including an arcuate portion and radially extending flange segments at its sides; a pressure distributing means fitting between the flange segments and connecting said shoe elements; and means bearing against the arcuate portions of said shoe elements to move said elements radially and constrict said pressure distributing means about a conduit.

10. A hose clamp comprising: a plurality of shoe elements adapted to be mounted coaxially about a hose; pressure-distributing means interposed between the shoe elements and hose; a tension strap slidable on the outer surfaces of said shoe elements; and means for constricting said strap to urge said shoe elements radially inwardly for indirect compression of said hose through said pressure-distributing means.

11. A hose clamp comprising a flexible band adapted to be looped about a hose, a plurality of segmental shoe elements fitting over the outer surface of said band, a tension strap around said shoe elements and slidable thereon, retainer lugs extending from the shoe elements and overlying the margins of said strap to retain said strap about said shoe elements, and means for drawing the ends of said strap together to move said shoe elements radially inwardly and constrict said band.

12. A hose clamp comprising a flexible band adapted to be wrapped about a hose, a plurality of segmental shoe elements fitting over the outer surface of said band, a tension strap encircling said shoe elements and slidable circumferentially thereon, retainer lugs extending from the shoe elements and overlying the margins of said strap to retain said strap about said shoe elements, and means for drawing the ends of said strap together to move said shoe elements radially inwardly and constrict said flexible band.

GERHARD MEYER.
CLAY G. WOODMANSEE.